United States Patent
Harada et al.

(10) Patent No.: US 9,375,978 B2
(45) Date of Patent: Jun. 28, 2016

(54) HUB UNIT

(71) Applicant: JTEKT CORPORATION, Osaka-shi, Osaka (JP)

(72) Inventors: Katsuyuki Harada, Yamatokoriyama (JP); Shuji Maeda, Otsu (JP)

(73) Assignee: JTEKT CORPORATION, Osaka (JP)

( * ) Notice: Subject to any disclaimer, the term of this patent is extended or adjusted under 35 U.S.C. 154(b) by 175 days.

(21) Appl. No.: 13/946,358

(22) Filed: Jul. 19, 2013

(65) Prior Publication Data

US 2014/0035349 A1    Feb. 6, 2014

(30) Foreign Application Priority Data

Jul. 31, 2012   (JP) ................. 2012-170096

(51) Int. Cl.
| | |
|---|---|
| *B60B 27/00* | (2006.01) |
| *B60B 7/00* | (2006.01) |
| *F16C 33/72* | (2006.01) |
| *F16C 19/18* | (2006.01) |

(52) U.S. Cl.
CPC ........... *B60B 7/0013* (2013.01); *B60B 27/0073* (2013.01); *B60B 27/00* (2013.01); *B60B 27/0005* (2013.01); *B60B 27/0094* (2013.01); *F16C 19/186* (2013.01); *F16C 33/723* (2013.01)

(58) Field of Classification Search
CPC .. B60B 27/00; B60B 27/0005; B60B 27/001; B60B 27/0073; B60B 27/02

USPC .............. 301/105.1, 111.03, 131, 544
See application file for complete search history.

(56) References Cited

U.S. PATENT DOCUMENTS

| | | | |
|---|---|---|---|
| 604,913 A | 5/1898 | Crandall | |
| 698,537 A | 4/1902 | Murdock et al. | |
| 1,319,683 A | 10/1919 | Ash | |
| 3,027,975 A * | 4/1962 | Erickson | ............ 184/106 |
| 6,758,531 B1 * | 7/2004 | Bullard | ........... B60B 3/16 |
| | | | 301/108.4 |
| 2011/0215637 A1 | 9/2011 | Fakhoury et al. | |

FOREIGN PATENT DOCUMENTS

| | | |
|---|---|---|
| JP | S63-141801 A | 6/1988 |
| JP | A-2007-001341 | 1/2007 |

OTHER PUBLICATIONS

Nov. 25, 2013 Extended European Search Report issued in European Application No. 13177760.9.
Apr. 5, 2016 Office Action issued in Japanese Patent Application No. 2012-170096.

* cited by examiner

*Primary Examiner* — John Walters
*Assistant Examiner* — James Triggs
(74) *Attorney, Agent, or Firm* — Oliff PLC

(57) ABSTRACT

A hub unit of the present invention includes a cap that covers an opening of a pilot portion, and the cap includes a cap body formed in a disc shape, and a cylindrical portion extending in an axial direction from an outer periphery of the cap body. The cap is removably attached to the pilot portion by screwing an external thread portion formed on an outer periphery of the cylindrical portion of the cap, to an internal thread portion formed on an inner periphery of the pilot portion.

3 Claims, 10 Drawing Sheets

HUB UNIT

INCORPORATION BY REFERENCE

The disclosure of Japanese Patent Application No. 2012-170096 filed on Jul. 31, 2012 including the specification, drawings and abstract, is incorporated herein by reference in its entirety.

BACKGROUND OF THE INVENTION

1. Field of the Invention

The present invention relates to a hub unit on which a wheel assembly is mounted.

2. Description of Related Art

A hub unit, for example, is used as a member that supports a wheel assembly of a vehicle rotatably with respect to a suspension. This hub unit includes a rolling bearing and a cylindrical hub wheel (see, for example, Japanese Patent Application Publication No. 2007-1341 A (JP2007-1341 A) (FIGS. 1 and 5)). The hub wheel serves as a bearing ring member of the rolling bearing. The hub unit (a bearing apparatus for a wheel assembly) described in JP2007-1341 A is configured such that an annular flange portion (a wheel assembly attachment flange) extending outwardly in a radial direction is provided integrally with an end portion of the hub wheel (a hub ring) at a vehicle outer side. A hub bolt for attaching a wheel of a wheel assembly and a brake disc is fixed to the flange portion.

Further, a pilot portion extending toward the vehicle outer side is provided integrally with the end portion of the hub wheel at the vehicle outer side so as to guide attachment of the wheel of the wheel assembly and the like. A nut screwed to a drive shaft pressed into an inner periphery of the hub wheel is inserted into this pilot portion. Further, a cap that covers an opening at the vehicle outer side is attached to the pilot portion so as to prevent occurrence of rust on an inner periphery of the pilot portion. A lug portion is formed on an outer periphery of a leading end portion of this cap. When this lug portion is engaged with an annular groove formed on the inner periphery of the pilot portion, it is possible to reliably fix the cap to the pilot portion.

In order to replace the hub unit, it is necessary to remove the cap from the pilot portion of the hub wheel and remove the nut screwed to the drive shaft. However, since the cap is fixed by engaging the lug portion with the annular groove of the pilot portion, it is difficult to remove the cap from the pilot portion. This causes such a problem that an operation of replacing the hub unit cannot be performed efficiently.

SUMMARY OF THE INVENTION

An object of the present invention is to provide a hub unit that is able to attach and detach a cap to and from a pilot portion easily.

A hub unit according to an aspect of the present invention includes: a rolling bearing; a cylindrical hub wheel that serves as a bearing ring member of the rolling bearing; and a cap that covers an opening of a cylindrical pilot portion formed in an end portion of the hub wheel at a vehicle outer side, wherein the cap includes a cap body formed in a disc shape, and a cylindrical portion that extends in an axial direction from an outer periphery of the cap body, and the cap is removably attached to the pilot portion by screwing an external thread portion formed on an outer periphery of the cylindrical portion of the cap, to an internal thread portion formed on an inner periphery of the pilot portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
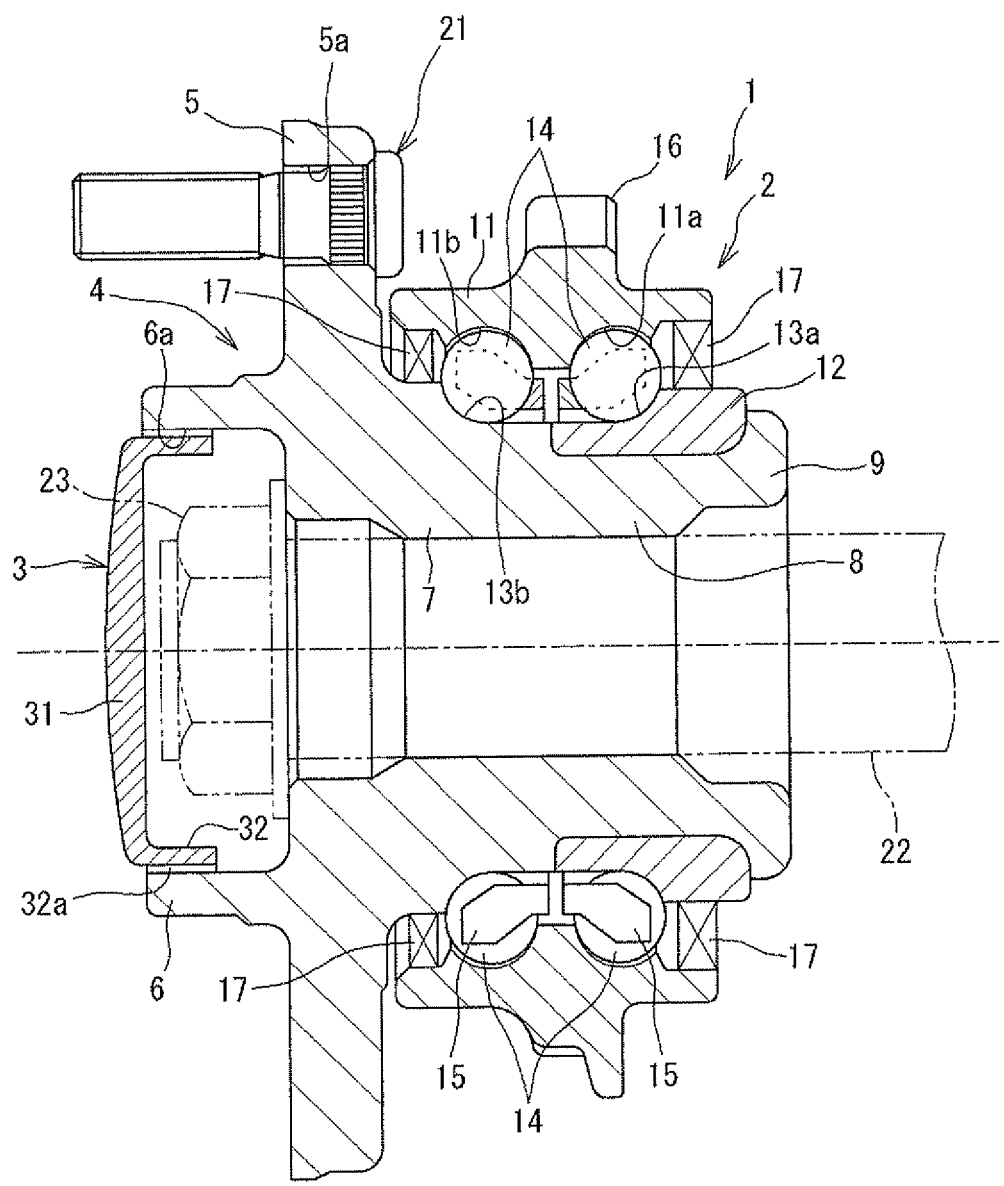
FIG. 1 is a sectional view illustrating a hub unit according to one embodiment of the present invention.

Embodiments of the present invention will be described below in detail with reference to attached drawings. FIG. 1 is a sectional view illustrating a hub unit according to one embodiment of the present invention. Note that, in the present specification, a right-left direction in FIG. 1 is referred to as an axial direction of a hub unit 1, a left side in FIG. 1 is referred to as a vehicle outer side, and a right side in FIG. 1 is referred to as a vehicle inner side. The hub unit 1 is a member that supports a wheel assembly of a vehicle rotatably with respect to a suspension at a vehicle body side, for example. The hub unit 1 includes a rolling bearing 2 and a cylindrical hub wheel 4. The hub wheel 4 serves as a bearing ring member of the rolling bearing 2. The hub wheel 4 integrally includes a large-diameter portion 7, a small-diameter portion 8, and a clinch portion 9. The large-diameter portion 7 is formed outside the hub wheel 4 in the axial direction. The small-diameter portion 8 has a diameter smaller than that of the large-diameter portion 7, and is formed to extend inwardly from the large-diameter portion 7 in the axial direction so as to be continuous with the large-diameter portion 7. The clinch portion 9 is formed by bending and deforming an end portion of the small-diameter portion 8 at an inner side in the axial direction, toward an outside in a radial direction.

The rolling bearing 2 is a double-row ball bearing, for example. The rolling bearing 2 includes an outer ring 11 and an inner ring member 12. The outer ring 11 has a pair of outer-ring raceway surfaces 11a and 11b in its inner peripheral surface. The inner ring member 12 is fitted by insertion so that an inner peripheral surface of the inner ring member 12 is in close contact with an outer peripheral surface of the small-diameter portion 8 of the hub wheel 4. The inner ring member 12 has, in its outer peripheral surface, an inner-ring raceway surface 13a opposed to the outer-ring raceway surface 11a at the vehicle inner side. The large-diameter portion 7 of the hub wheel 4 has, in its outer peripheral surface, an inner-ring raceway surface 13b opposed to the outer-ring raceway surface 11b at the vehicle outer side.

Further, the rolling bearing 2 includes a plurality of balls (rolling elements) 14 and a pair of cages 15. The balls 14 are disposed in two rows. The cages 15 retain the balls 14 thus disposed in two rows at predetermined intervals in a circumferential direction. The balls 14 are disposed in a rollable manner between the outer-ring raceway surface 11a and the inner-ring raceway surface 13a and between the outer-ring raceway surface 11b and the inner-ring raceway surface 13b. On an outer peripheral surface of the outer ring 11, a fixed flange 16 for attaching the hub unit 1 to a vehicle-body side member (not illustrated) supported by the suspension is formed. Further, in an annular space formed between the outer ring 11 and the hub wheel 4, sealing members 17 that seal the annular space from respective axial ends thereof are provided.

In an end portion of the hub wheel 4 at the vehicle outer side, an annular flange portion 5 extending from an outer peripheral surface of the end portion outwardly in the radial direction is integrally formed. In the flange portion 5, a plurality of bolt holes 5a extending through the flange portion 5 in its thickness direction is formed in the circumferential direction. A hub bolt 21 for attaching a wheel of the wheel assembly, a brake disc, and the like (not shown) is pressed into each of the bolt holes 5a, and fixed thereto. Further, in the end portion of the hub wheel 4 at the vehicle outer side, a cylindrical pilot portion 6 extending toward the vehicle outer side is integrally formed so as to guide attachment of the wheel of the wheel assembly and the brake disc. An internal thread portion 6a is formed on an inner periphery of the pilot portion 6. Further, a nut 23, which is screwed to an end portion of a drive shaft 22 at the vehicle outer side, is inserted in the pilot portion 6. The drive shaft 22 is pressed into an inner periphery of the hub wheel 4.

The hub unit 1 further includes a cap 3 that covers an opening of the pilot portion 6 at the vehicle outer side. The cap 3 includes a cap body 31 and a cylindrical portion 32. The cap body 31 is formed in a disc shape. The cylindrical portion 32 extends in the axial direction (toward the vehicle inner side) from an outer peripheral edge of the cap body 31. An outside diameter of the cylindrical portion 32 is smaller than an inside diameter of the pilot portion 6. An external thread portion 32a screwed to the internal thread portion 6a of the pilot portion 6 is formed on an outer periphery of the cylindrical portion 32. Thus, the cap 3 is removably attached to the pilot portion 6.

Figure 2A:
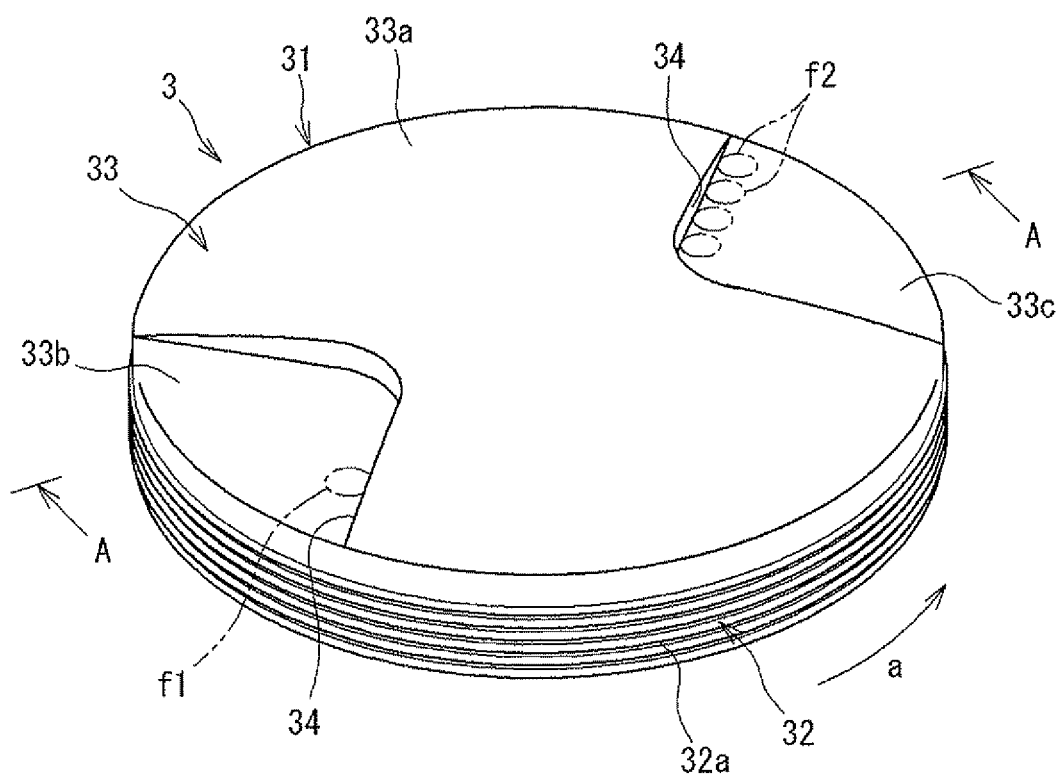
FIGS. 2A and 2B illustrate a cap of the hub unit, FIG. 2A being a perspective view thereof, and FIG. 2B being a sectional view taken along a line A-A in FIG. 2A.
Figure 2B:
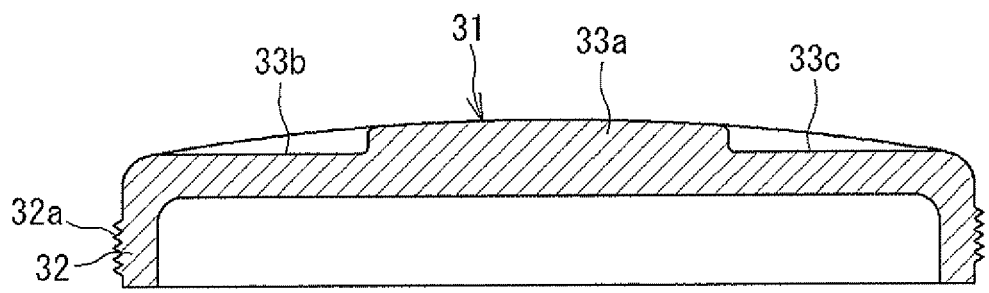

FIG. 2A illustrates a perspective view of the cap 3. FIG. 2B is a sectional view taken along a line A-A in FIG. 2A. As illustrated in FIGS. 2A and 2B, an outer surface of the cap body 31 has a design characteristic. An uneven portion 33, which is gripped when the cap 3 is rotated in a direction (a direction indicated by an arrow a in FIG. 2A) in which the cap 3 is unscrewed, is formed on the outer surface of the cap body 31. The uneven portion 33 of the present embodiment is constituted by a single protruding portion 33a and two recessed portions, i.e., first and second recessed portions 33b and 33c. The protruding portion 33a projects substantially in a drum shape in a plane view. The first and second recessed portions 33b and 33c are formed substantially in a fan shape in a plane view. An outer surface of the protruding portion 33a is formed in an arc shape in a sectional view, as illustrated in FIG. 2B.

The uneven portion 33 includes two finger placing portions 34 on which a thumb f1 of a hand of an operator and a finger (at least one of the four fingers) 12 other than the thumb f1 are individually placed, when the uneven portion 33 is gripped. In the present embodiment, a right half, in FIG. 2A, of a stepped surface between the protruding portion 33a and the first recessed portion 33b and a left half, in FIG. 2A, of a stepped surface between the protruding portion 33a and the second recessed portion 33c serve as the respective finger placing portions 34. Thus, in a state where the thumb f1 is being placed on one of the finger placing portions 34, the finger 12 other than the thumb can be placed on the other of the finger placing portions 34. It is determined which one of the finger placing portions 34 the thumb f1 is placed on, according to convenience of the operator.

In the hub unit 1 according to the embodiment of the present invention, the cap 3 is removably attached to the pilot portion 6 by engaging the external thread portion 32a of the cap 3 with the internal thread portion 6a of the pilot portion 6. This makes it possible to easily remove the cap 3 from the pilot portion 6 by rotating the cap 3 in the direction in which the cap 3 is unscrewed, when the hub unit 1 is replaced. Accordingly, it is possible to perform an operation of replacing the hub unit 1 efficiently.

Further, it is possible to perform a rotation operation by gripping the uneven portion 33 formed on the cap body 31 to rotate the cap 3 in the direction in which the cap 3 is unscrewed, thereby making it possible to further easily remove the cap 3. Further, since the uneven portion 33 has the design characteristic, it is possible to improve an appearance of the cap 3.

The outer surface of the cap body 31 has the design characteristic. Also, the uneven portion 33 to be gripped when the cap 3 is rotated in the direction in which the cap 3 is unscrewed is formed on the outer surface of the cap body 31. The uneven portion 33 includes the finger placing portions 34 on which the thumb f1 and the finger f2 other than the thumb are individually placed. That is, in the present invention, the uneven portion 33 formed on the outer surface of the cap body 31 to improve the appearance is usable as a gripping member for unscrewing the cap 3, that is, the uneven portion 33 is usable for a completely different purpose. Since the screwing structure of the cap 3 with respect to the pilot portion 6 is organically combined with the uneven portion 33 as the gripping member, it is possible to obtain a hub unit that has the following advantageous effect. That is, when the uneven portion 33 is gripped and the cap 3 is rotated in the direction in which the cap 3 is unscrewed, the rotation operation can be performed in such a state where the thumb f1 and the finger f2 other than the thumb are individually placed on the finger placing portions 34, and thus, it is possible to further easily remove the cap 3.

FIGS. 3A to 10B illustrate uneven portions 33 of caps 3 according to modified examples, respectively. In each of the modified examples in FIGS. 3A to 6 and FIGS. 10A and 10B among FIGS. 3A to 10B, a part of an outer surface of a cap body 31 protrudes to form an uneven portion 33. Further, in each of the modified examples in FIGS. 7A to 9B, a part of an outer surface of a cap body 31 is recessed to form an uneven portion 33. Each of the uneven portions 33 in these modified examples is formed to have a design characteristic. Hereinafter, the modified examples in FIGS. 3A to 10B will be described sequentially.

Figure 3A:
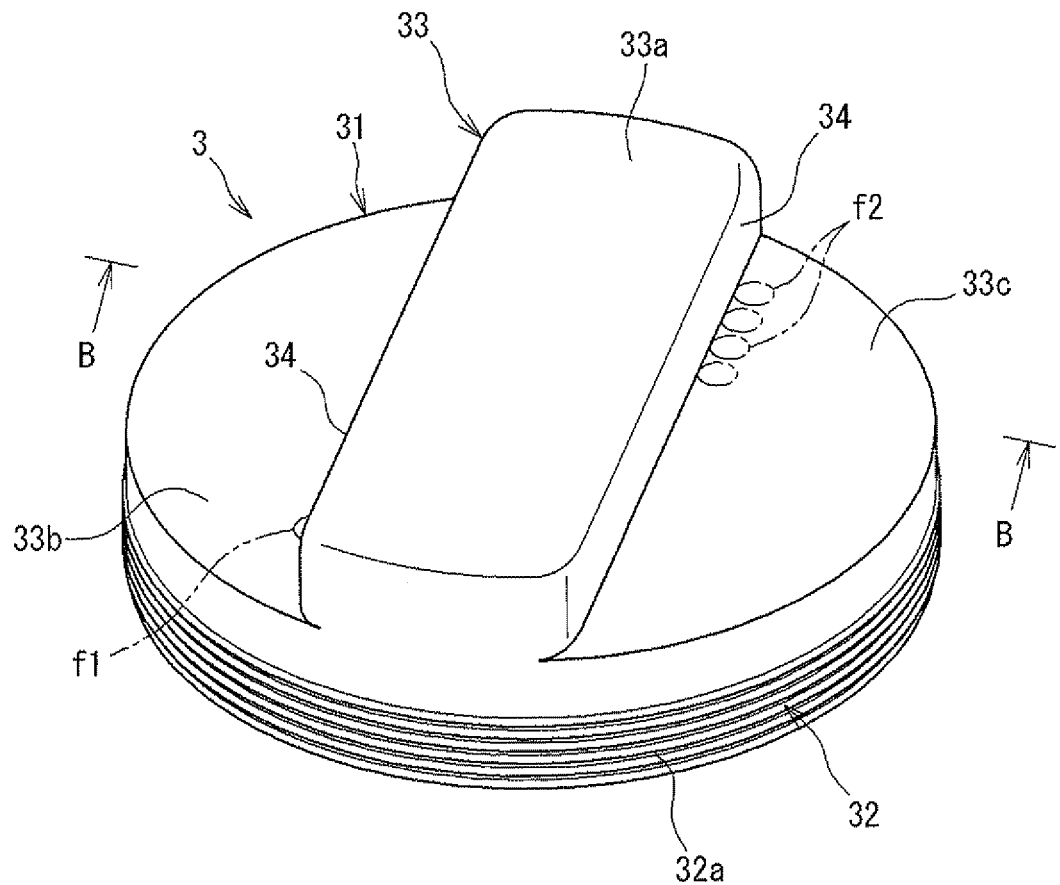
FIGS. 3A and 3B illustrate an uneven portion of a cap according to a modified example, FIG. 3A being a perspective view thereof, and FIG. 3B being a sectional view taken along a line B-B in FIG. 3A.
Figure 3B:
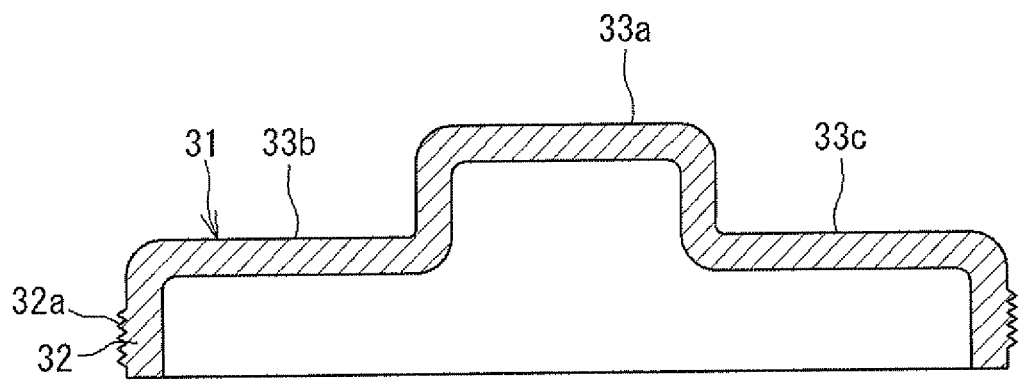

An uneven portion 33 in the modified example in FIGS. 3A and 3B is constituted by a protruding portion 33a and two recessed portions, i.e., first and second recessed portions 33b and 33c each of which is formed substantially in a semicircular shape in a plane view so that the protruding portion 33a is sandwiched between the first and second recessed portions 33b and 33c. The protruding portion 33a is formed substantially in a rectangular shape in a plane view. In this modified example, a lower half, in FIG. 3A, of a stepped surface between the protruding portion 33a and the first recessed portion 33b and an upper half, in FIG. 3A, of a stepped surface between the protruding portion 33a and the second recessed portion 33c serve as respective finger placing portions 34. Thus, in a state where a thumb f1 is being placed on one of the finger placing portions 34, a finger f2 other than the thumb can be placed on the other of the finger placing portions 34.

Figure 4:
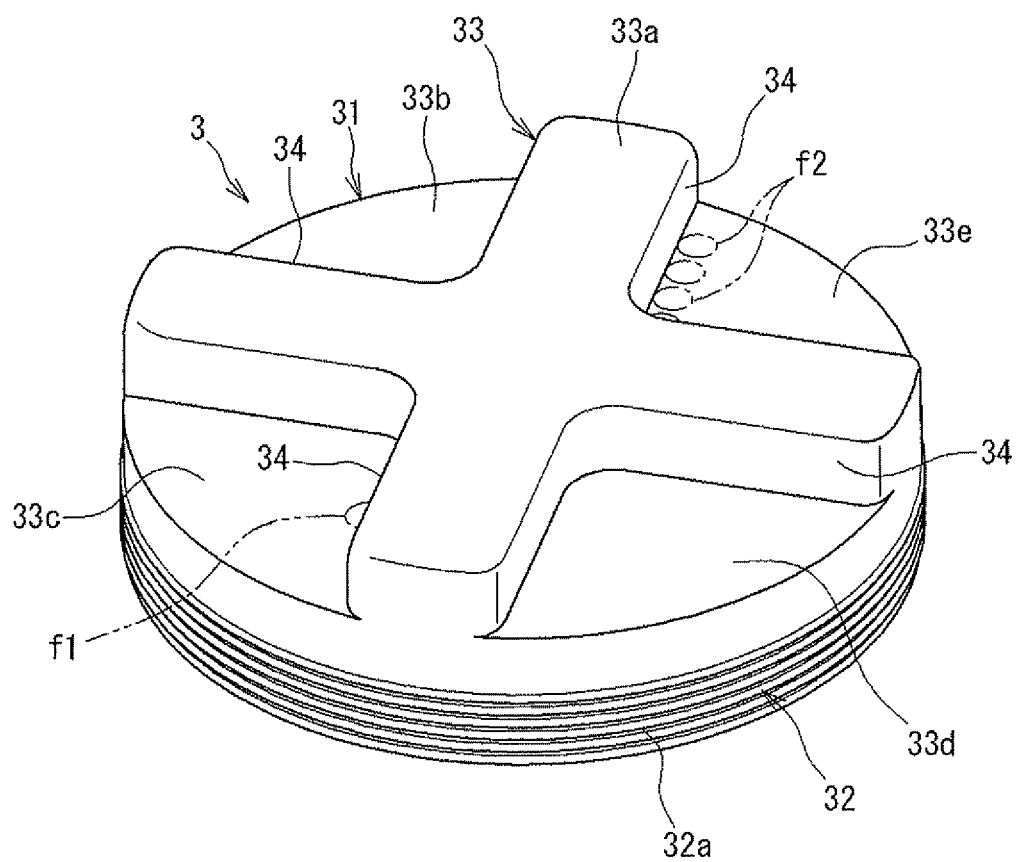
FIG. 4 is a perspective view illustrating an uneven portion of a cap according to a modified example.

An uneven portion 33 in the modified example in FIG. 4 is constituted by a single protruding portion 33a and four recessed portions, i.e., first to fourth recessed portions 33b to 33e. The protruding portion 33a is formed in a cross shape in a plane view. Each of the first to fourth recessed portions 33b to 33e is formed in a fan shape in a plane view. In this modified example, a stepped surface between the protruding portion 33a and an end portion of each of the recessed portions 33b to 33e in a counterclockwise direction in FIG. 4 serves as a finger placing portion 34 on which a thumb f1 or a finger f2 other than the thumb is placed. For example, a part of the stepped surface between the protruding portion 33a and the second recessed portion 33c, which extends downward in FIG. 4, can serve as the finger placing portion 34 on which the thumb f1 is placed. In this case, a part of the stepped surface between the protruding portion 33a and the fourth recessed portion 33e, which extends upward in FIG. 4, can serve as the finger placing portion 34 on which the finger f2 other than the thumb is placed.

Figure 5:
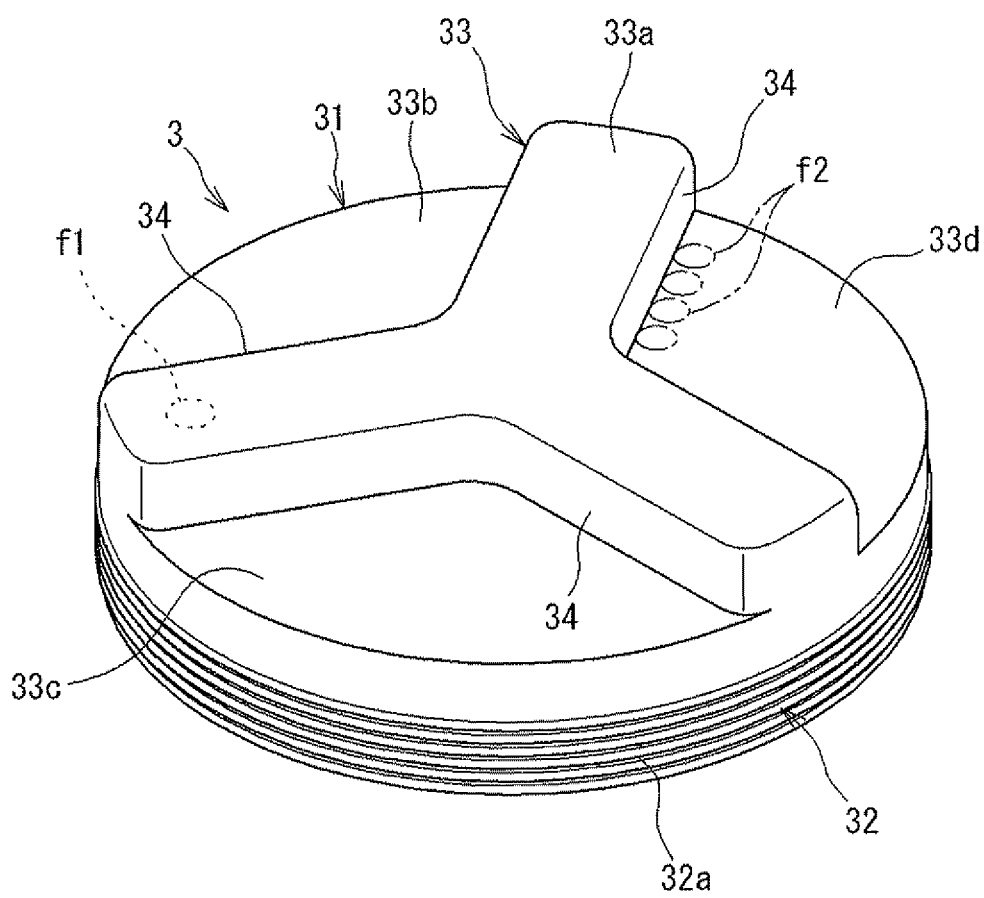
FIG. 5 is a perspective view illustrating an uneven portion of a cap according to a modified example.

An uneven portion 33 in the modified example in FIG. 5 is constituted by a single protruding portion 33a and three recessed portions, i.e., first to third recessed portions 33b to 33d. The protruding portion 33a is formed to have a trifurcate shape in a plane view. Each of the first to third recessed portions 33b to 33d is formed in a fan shape in a plane view. In this modified example, a stepped surface between the protruding portion 33a and an end portion of each of the recessed portions 33b to 33d in a counterclockwise direction in FIG. 5 serves as a finger placing portion 34 on which a thumb f1 or a finger f2 other than the thumb is placed. For example, a part of the stepped surface between the protruding portion 33a and the first recessed portion 33b, which extends diagonally downward to the left in FIG. 5, can serve as the finger placing portion 34 on which the thumb f1 is placed. In this case, a part of the stepped surface between the protruding portion 33a and the third recessed portion 33d, which extends upward in FIG. 5, can serve as the finger placing portion 34 on which the finger f2 other than the thumb is placed.

Figure 6:
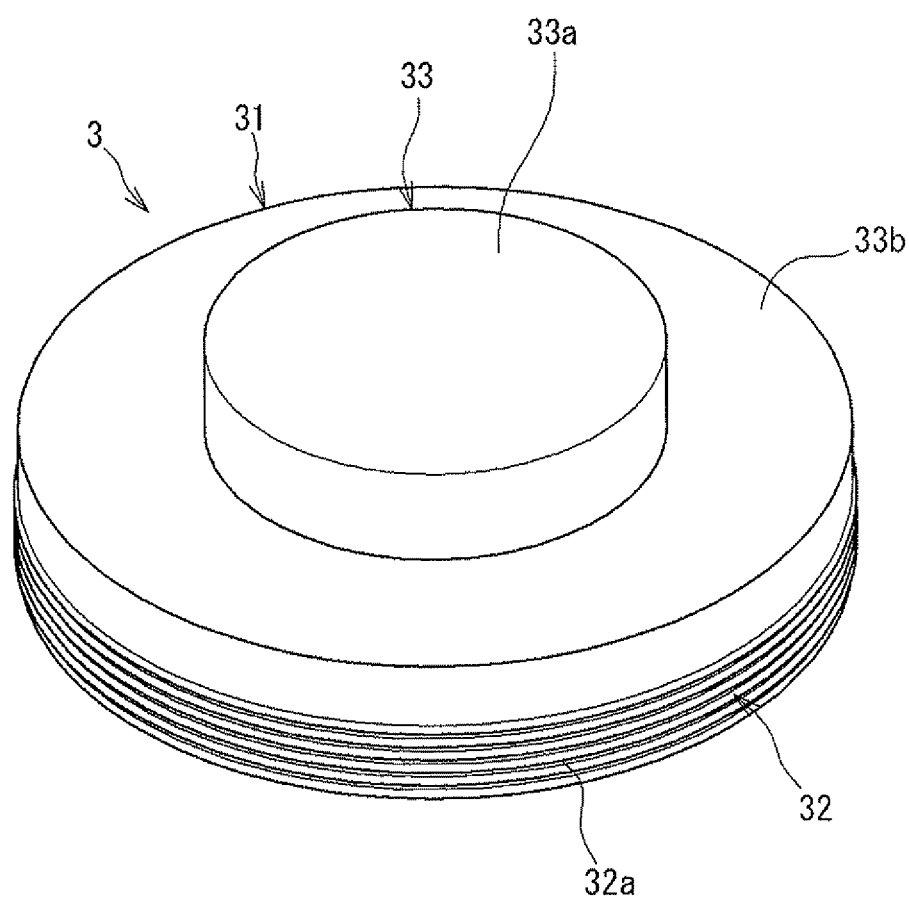
FIG. 6 is a perspective view illustrating an uneven portion of a cap according to a modified example.

An uneven portion 33 in the modified example in FIG. 6 is constituted by a single protruding portion 33a and a single recessed portion 33b formed in an annular shape in a plane view outside the protruding portion 33a. The protruding portion 33a is formed in a circle shape in a plane view. In this modified example, it is possible to rotate a cap 3 in a direction in which the cap 3 is unscrewed, by gripping a circular stepped surface formed between the protruding portion 33a and the recessed portion 33b.

Figure 7A:
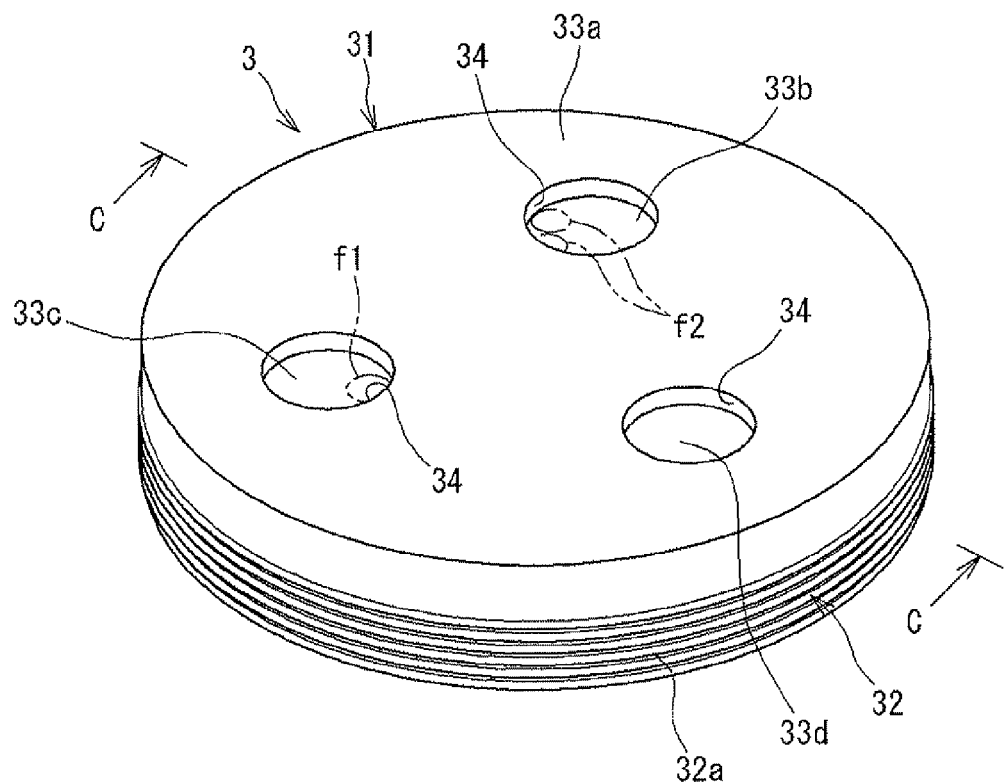
FIGS. 7A and 7B illustrate an uneven portion of a cap according to a modified example, FIG. 7A being a perspective view thereof, and FIG. 7B being a sectional view taken along a line C-C in FIG. 7A.
Figure 7B:
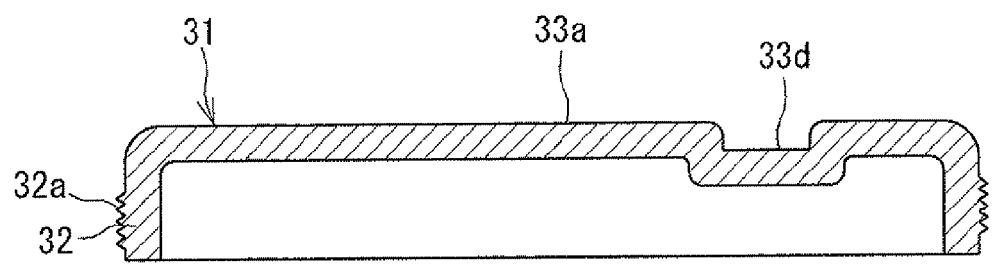

An uneven portion 33 in the modified example in FIGS. 7A and 7B is constituted by three recessed portions, i.e., first to third recessed portions 33b to 33d, and a single protruding portion 33a formed entirely on an outer surface of a cap body 31 except areas where the recessed portions 33b to 33d are provided. Each of the first to third recessed portions 33b to 33d is formed in a circle shape in a plane view. In this modified example, a stepped surface between the protruding portion 33a and each of the recessed portions 33b to 33e serves as a finger placing portion 34 on which a thumb f1 or a finger f2 other than the thumb is placed. For example, a right half, in FIG. 7A, of the stepped surface between the protruding portion 33a and the second recessed portion 33c can serve as the finger placing portion 34 on which the thumb f1 is placed. In this case, a left half, in FIG. 7A, of the stepped surface between the protruding portion 33a and the first recessed portion 33b can serve as the finger placing portion 34 on which the finger f2 other than the thumb is placed.

Figure 8A:
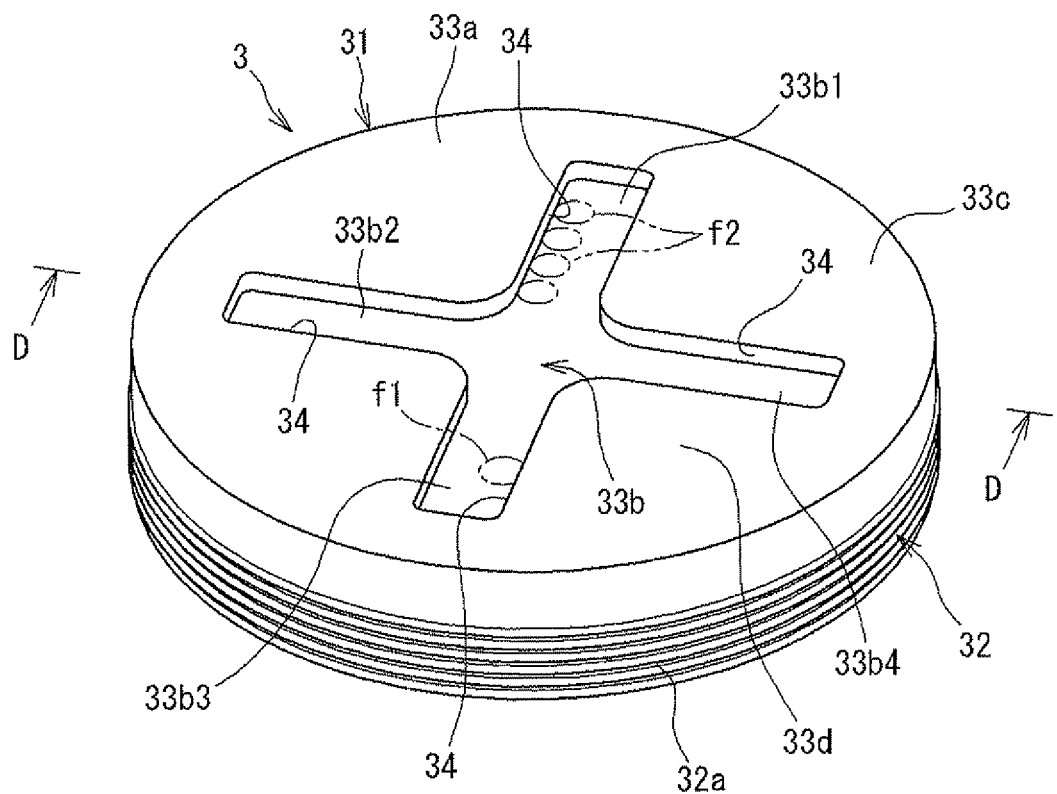
FIGS. 8A and 8B illustrate an uneven portion of a cap according to a modified example, FIG. 8A being a perspective view thereof, and FIG. 8B being a sectional view taken along a line D-D in FIG. 8A.
Figure 8B:
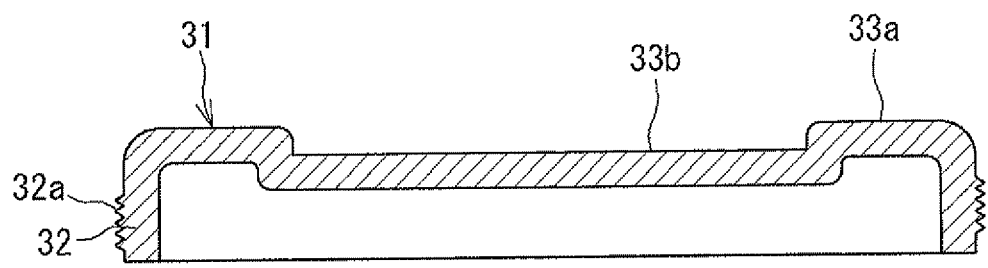

An uneven portion 33 in the modified example in FIGS. 8A and 8B is constituted by a single protruding portion 33a and a single recessed portion 33b. The recessed portion 33b is formed in a cross shape in a plane view. The recessed portion 33b includes four linear recessed portions, i.e., first to fourth linear recessed portions 33b1 to 33b4 extending radially from a central portion of an outer surface of a cap body 31. In this modified example, a stepped surface between the protruding portion 33a and an end portion of each of the linear recessed portions 33b1 to 33b4 in a counterclockwise direction in FIG. 8A serves as a finger placing portion 34 on which a thumb f1 or a finger f2 other than the thumb is placed. For example, a right half, in FIG. 8A, of the stepped surface between the protruding portion 33a and the third linear recessed portion 33b3 can serve as the finger placing portion 34 on which the thumb f1 is placed. In this case, a left half, in FIG. 8A, of the stepped surface between the protruding portion 33a and the first linear recessed portion 33b1 can serve as the finger placing portion 34 on which the finger f2 other than the thumb is placed.

Figure 9A:
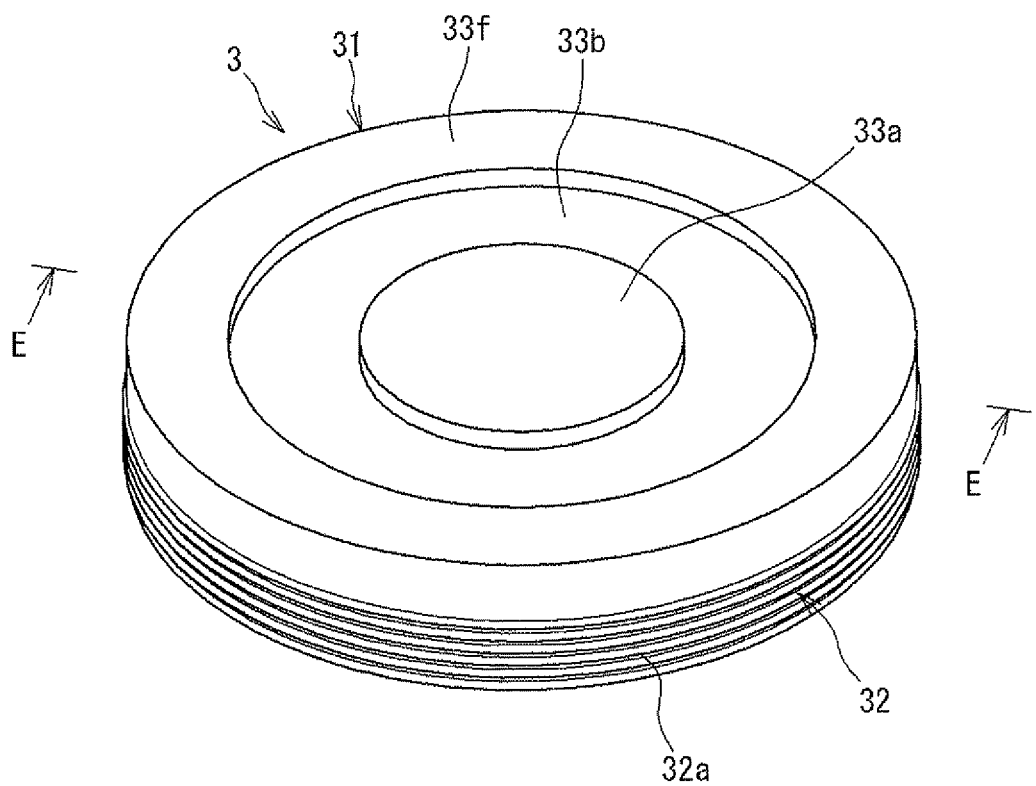
FIGS. 9A and 9B illustrate an uneven portion of a cap according to a modified example, FIG. 9A being a perspective view thereof, and FIG. 9B being a sectional view taken along a line E-E in FIG. 9A.
Figure 9B:
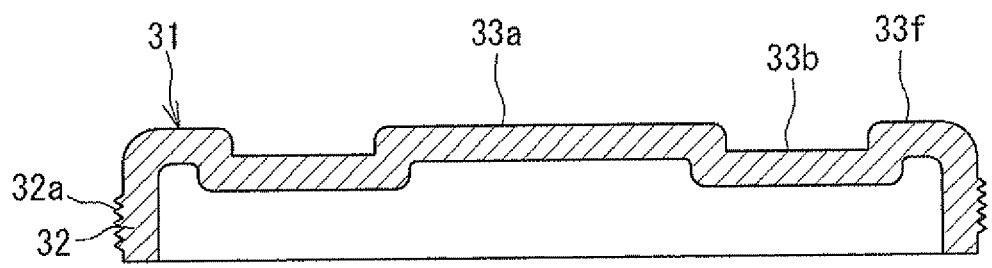

An uneven portion 33 in the modified example in FIGS. 9A and 9B is constituted by a single recessed portion 33b, a first protruding portion 33a, and a second protruding portion 33f. The recessed portion 33b is formed in an annular shape in a plane view. The first protruding portion 33a is formed in a circle shape in a plane view inside the recessed portion 33b, and the second protruding portion 33f is formed in an annular shape in a plane view outside the recessed portion 33b. In this modified example, it is possible to rotate a cap 3 in a direction in which the cap 3 is unscrewed, by gripping a circular stepped surface formed between the protruding portion 33a and the recessed portion 33b.

Figure 10A:
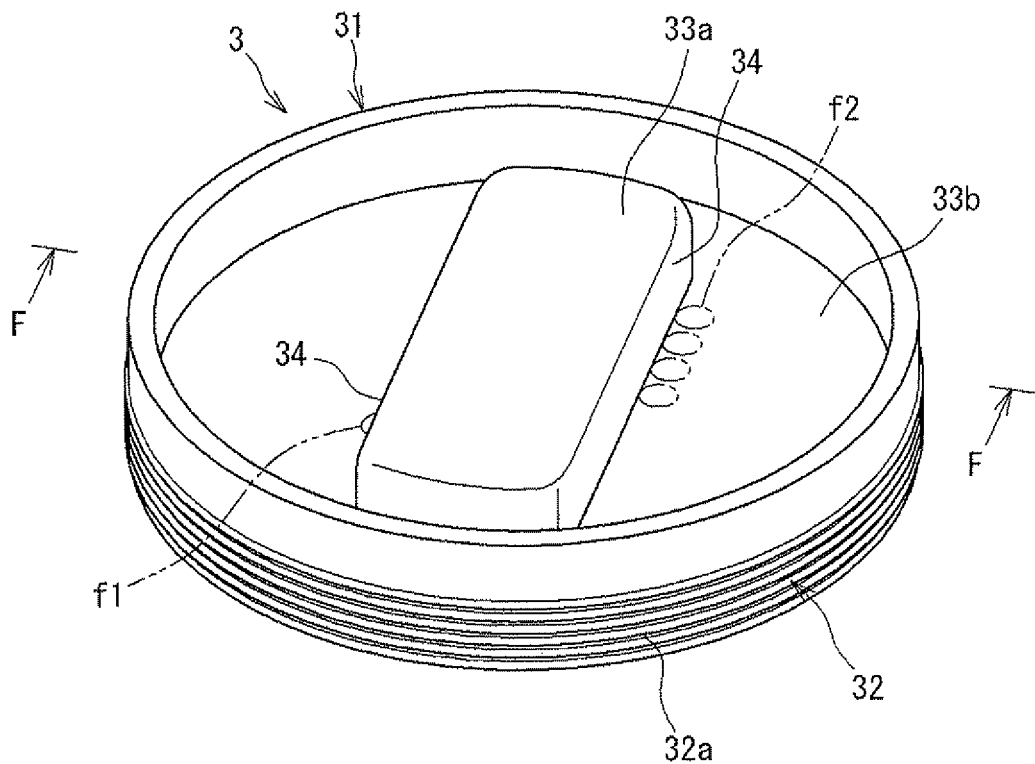
FIGS. 10A and 10B illustrate an uneven portion of a cap according to a modified example, FIG. 10A being a perspective view thereof, and FIG. 10B being a sectional view taken along a line F-F in FIG. 10A.
Figure 10B:
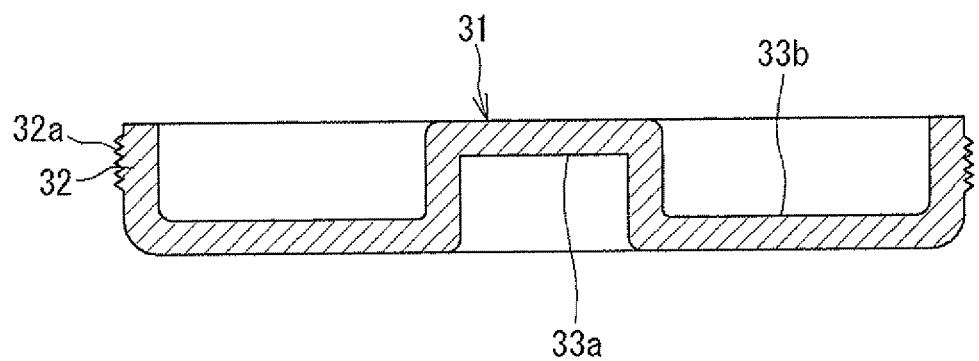

In the modified example in FIGS. 10A and 10B, a cylindrical portion 32 is formed to extend from an outer peripheral edge of a cap body 31 toward the vehicle outer side. An uneven portion 33 formed on an outer surface of the cap body 31 is constituted by a single protruding portion 33a and a single recessed portion 33b. The protruding portion 33a is formed in a rectangular shape in a plane view. The recessed portion 33b is formed entirely on the outer surface of the cap body 31 except an area where the protruding portion 33a is provided. In this modified example, a left lower half, in FIG. 10A, of a stepped surface between the protruding portion 33a and the recessed portion 33b and a right upper half, in FIG. 10A, of the stepped surface serve as respective finger placing portions 34. Thus, in a state where a thumb f1 is being placed on one of the finger placing portions 34, a finger f2 other than the thumb can be placed on the other of the finger placing portions 34.

Note that the present invention is not limited to the above embodiments, and may be implemented with appropriate modification. For example, in the above embodiments, the uneven portion 33 is formed on the outer surface of the cap body 31. However, the uneven portion 33 is not necessarily required to be formed. Further, the rolling bearing 2 in the above embodiments is constituted by a double-row ball bearing. However, the rolling bearing 2 may be constituted by other rolling bearings such as a tapered roller bearing.

According to the hub unit of the present invention, since the cap is easily removable from the pilot portion, it is possible to perform the operation of replacing the hub unit efficiently.

What is claimed is:

1. A hub unit comprising:
   a rolling bearing;
   a cylindrical hub wheel that serves as a bearing ring member of the rolling bearing; and
   a cap that covers an opening of a cylindrical pilot portion formed in an end portion of the hub wheel at a vehicle outer side,
   wherein the cap includes a cap body formed in a disc shape, and a cylindrical portion that extends in an axial direction from an outer periphery of the cap body, an axial cross-section of the cap body being thicker than the cylindrical portion,
   the cap is removably attached to the pilot portion by screwing an external thread portion formed on a full length outer periphery of the cylindrical portion of the cap, to an internal thread portion formed on an inner periphery of the pilot portion, and
   an uneven portion, which is gripped when the cap is rotated in a direction in which the cap is unscrewed, is formed on an outer surface of the cap body.

2. The hub unit according to claim 1, wherein the uneven portion includes at least two finger placing portions on which a thumb and a finger other than the thumb are individually placed.

3. The hub unit according to claim 1, wherein an outer periphery of the cap body has a constant outer diameter.

* * * * *